United States Patent
Tokizawa

(10) Patent No.: US 7,958,621 B2
(45) Date of Patent: Jun. 14, 2011

(54) METHOD OF MANUFACTURING A ROTOR FOR A ROTATING ELECTRICAL MACHINE

(75) Inventor: Takashi Tokizawa, Nagoya (JP)

(73) Assignee: Denso Corporation, Kariya (JP)

( * ) Notice: Subject to any disclaimer, the term of this patent is extended or adjusted under 35 U.S.C. 154(b) by 913 days.

(21) Appl. No.: 11/808,710

(22) Filed: Jun. 12, 2007

(65) Prior Publication Data

US 2007/0294878 A1 Dec. 27, 2007

(30) Foreign Application Priority Data

Jun. 23, 2006 (JP) .................................. 2006-174488

(51) Int. Cl.
*H02K 1/22* (2006.01)
*H02K 15/02* (2006.01)

(52) U.S. Cl. .......................................... 29/598; 310/263

(58) Field of Classification Search ..................... 29/598; 310/263

See application file for complete search history.

(56) References Cited

U.S. PATENT DOCUMENTS

| 4,339,873 A | 7/1982 | Kanamaru et al. |
| 4,377,762 A | 3/1983 | Tatsumi et al. |
| 6,114,786 A * | 9/2000 | Ishida et al. ................. 310/71 |

FOREIGN PATENT DOCUMENTS

| JP | A 56-98349 | 8/1981 |
| JP | A 11-220845 | 8/1999 |

\* cited by examiner

*Primary Examiner* — A. Dexter Tugbang
*Assistant Examiner* — Livius R Cazan
(74) *Attorney, Agent, or Firm* — Oliff & Berridge, PLC

(57) ABSTRACT

A method of manufacturing a rotor for a rotating electrical machine includes the steps of: preparing a first and a second pole core, a rotary shaft, and a field coil; press-fitting the rotary shaft into a through-hole of the first pole core so that the axes of the rotary shaft and the through-hole coincide with each other; mounting the field coil on one of the first and second pole cores; opposing the first and second pole cores to each other so that the axes of the through-holes thereof are in alignment with each other and contact surfaces thereof face each other with a maximum parallelism therebetween; press-fitting the second pole core onto the rotary shaft so that the contact surfaces of the first and second pole cores maximally contact with each other and the axis of the rotary shaft coincides with the axes of the through-holes of the pole cores.

20 Claims, 15 Drawing Sheets

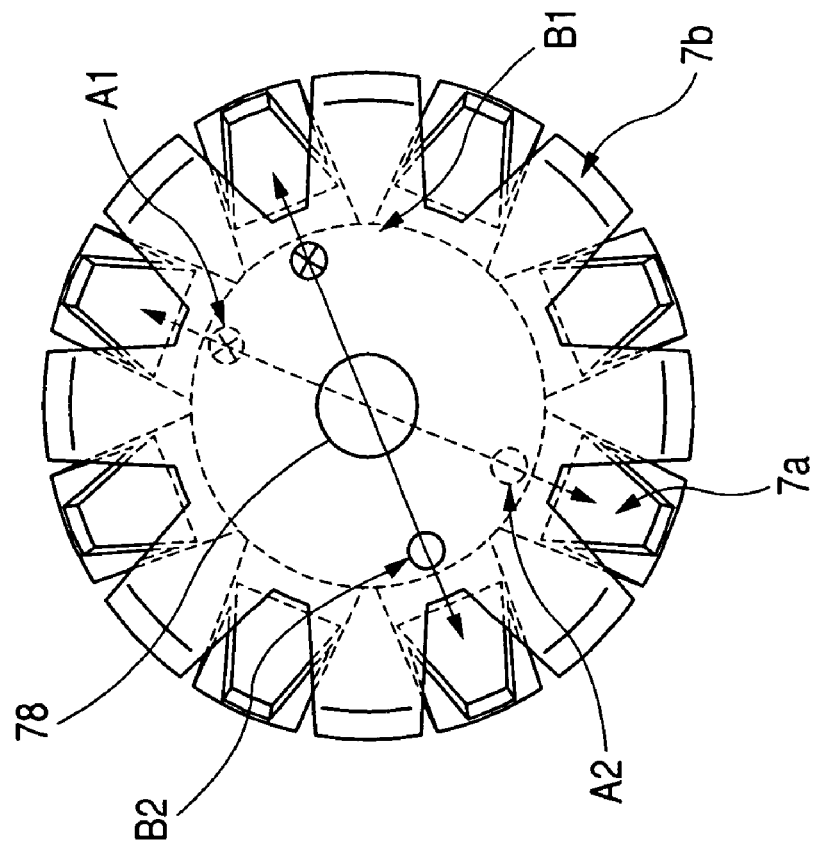
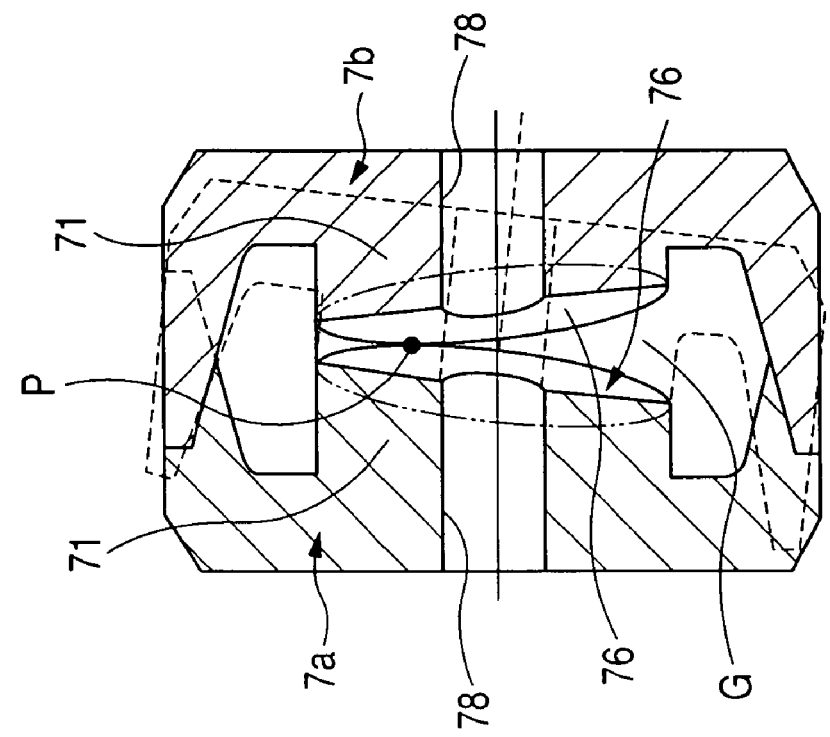

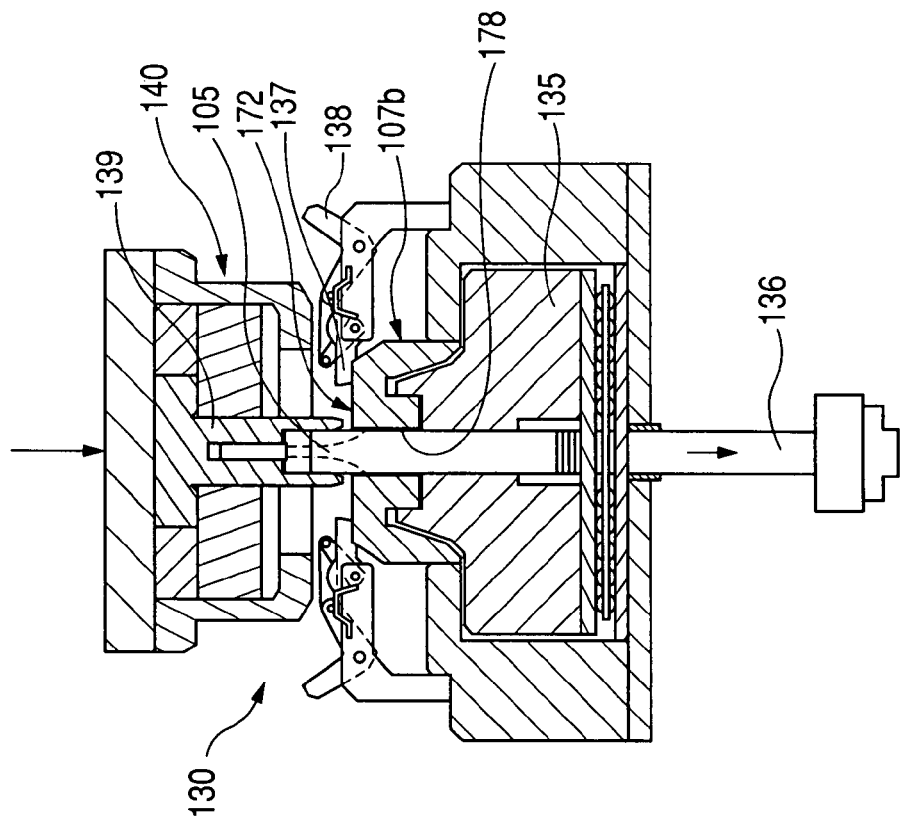
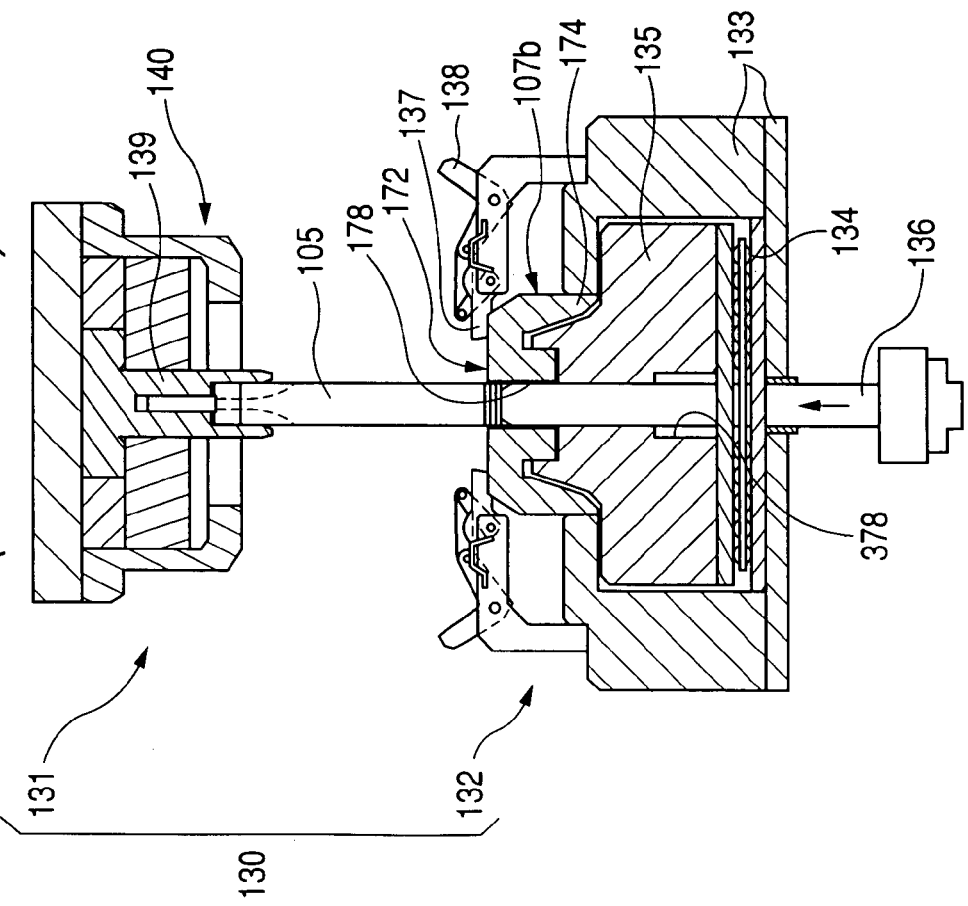
FIG. 12A (PRIOR ART)
FIG. 12B (PRIOR ART)

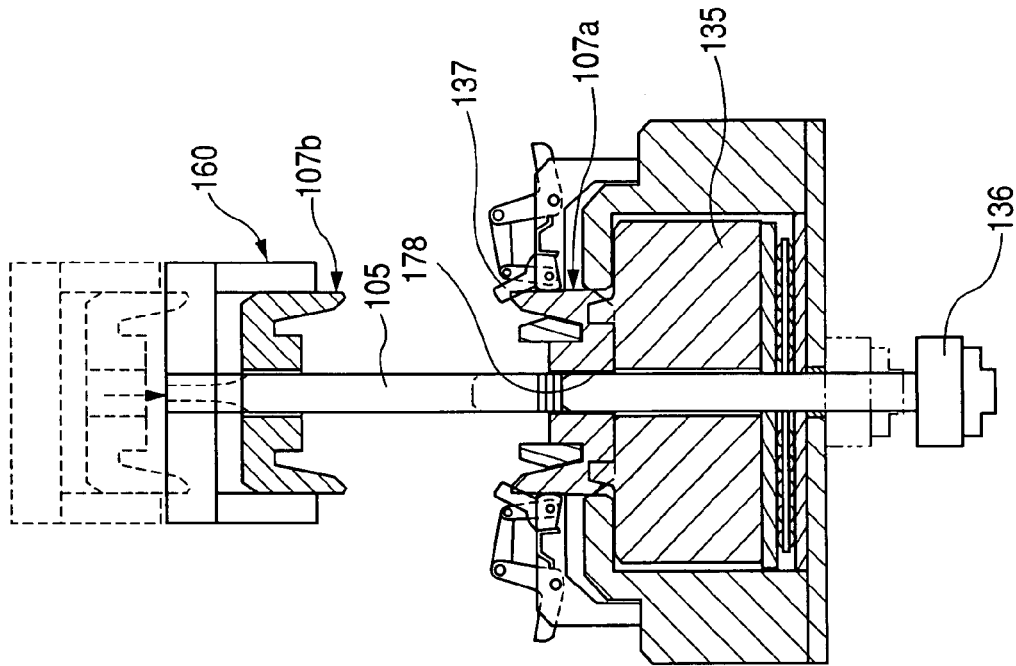
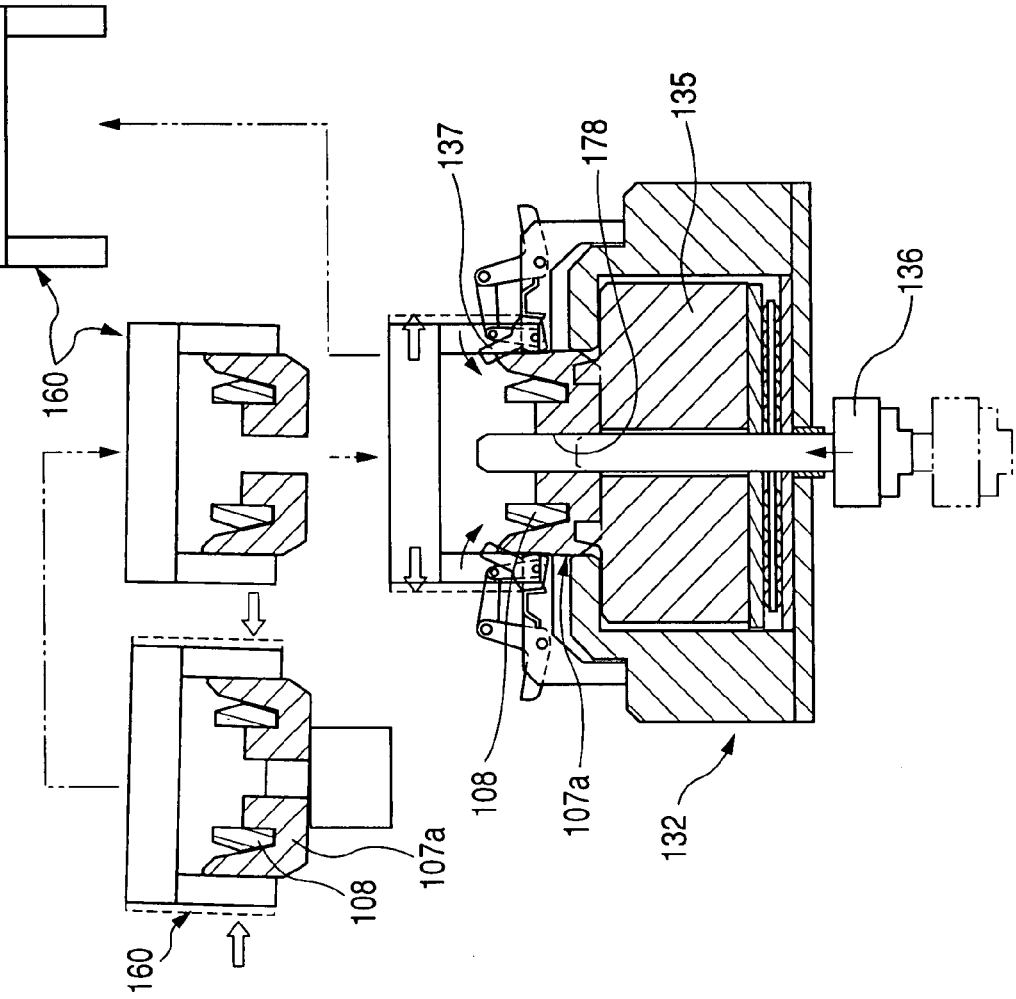

METHOD OF MANUFACTURING A ROTOR FOR A ROTATING ELECTRICAL MACHINE

CROSS-REFERENCE TO RELATED APPLICATION

This application is based on and claims priority from Japanese Patent Application No. 2006-174488, filed on Jun. 23, 2006, the content of which is hereby incorporated by reference into this application.

BACKGROUND OF THE INVENTION

1. Technical Field of the Invention

The present invention relates generally to rotors for rotating electrical machines, such as electric generators and motors, and methods of manufacturing the rotors. More particularly, the invention relates a rotor for an automotive alternator, which includes a pair of lundell-type pole cores, and its manufacturing methods.

2. Description of the Related Art

In a conventional automotive alternator, a rotor generally includes a pair of lundell-type pole cores which have the same shape and are opposed on a rotary shaft so as to abut each other. (For example, Japanese Patent First Publication H11-220845 discloses such a rotor.)

More specifically, each of the pole cores includes a cylindrical base portion fitted on the rotary shaft, a plurality of prismatic claw-base portions that each extend radially outward from an axially outer part of the base portion and are arranged in the circumferential direction of the rotary shaft at predetermined intervals, and a plurality of claw portions each of which axially extends from one of the claw-base portions. Further, the claw portions of one of the pole cores are interleaved with those of the other pole core, surrounding a field coil that is wound around the base portions of the pole cores. In addition, the rotor is so arranged in the automotive alternator that the claw portions of the pole cores are surrounded by a stator core.

In order to secure the mechanical strength of such a conventional rotor even when it rotates at high speeds, U.S. Pat. No. 4,377,762 discloses a method of fastening the pole cores to the rotary shaft.

More specifically, according to the disclosed method, the rotary shaft has a plurality of axially-extending protuberances on the outer surface thereof and annular grooves formed at axial positions corresponding to axially outer end faces of the pole cores. Each of the pole cores has a through-hole that is formed through the center of the base portion of the pole core. In assembly of the rotor, the rotary shaft is first pressed into the through-holes of the pole cores with the annular grooves being positioned slightly axially inward of the corresponding end faces of the pole cores. Then, staking crimp is applied to the pole cores to securely fasten them onto the rotary shaft.

Moreover, the pole cores of such a conventional rotor are generally forged using soft steel. However, due to limited precision of the forging equipment, there will be variations in parallelism between the end faces of the pole cores.

More specifically, referring to FIG. 11, the through-hole 178 of a pole core 107 can be formed based on either of several different reference faces. For example, the through-hole 178 can be formed to be perpendicular to either the axially outer end face 172 or the axially inner end face 176 of the pole core 107. Alternatively, the through-hole 178 can also be formed to be perpendicular to the bottom face 177 of an annular recess formed between the base portion and the claw portions of the pole core 107.

FIGS. 12A-15B illustrate a conventional rotor assembly process, wherein the through-hole 178 of each of the pole cores 107a and 107b is formed to be perpendicular to the axially outer end face 172.

Referring first to FIGS. 12A-12B, a pressing machine 130 is used for pressing the rotary shaft 105 into the through-holes 178 of the pole cores 107a and 107b, which includes a punch portion 131 and a die portion 132.

The punch portion 131 includes a punch 140 that is configured to move upward and downward. Further, the punch 140 includes therein a shaft holder 139 for holding the shaft 105 to be parallel to the vertical direction.

The die portion 132 includes a base 133, a bearing 134 provided on the base 133, and a mount 135 that is supported by the base 133 through the bearing 134. The mount 135 has center a through-hole 378 within which a center holder 136 is slidably disposed. The bearing 134 also serves to move the mount 135 horizontally, when the center of the mount 135 does not coincide with that of the center holder 136, thereby bringing the centers of the mount 135 and the center holder 136 into coincident with each other. Further, in the die portion 132, there are provided at least two claw-like holders 137 fixed to the base 133. The claw-like holders 137 work to press both axially and radially the pole core 107b, which is set on the mount 135 as a work, so as to hold it on the mount 135. In addition, it is possible to selectively make, using a lever 138, the claw-like holders 137 either hold or release the work set on the mount 135 (i.e., the pole core 107b in this case).

The conventional rotor assembly process includes the following steps.

At the first step, the pole core 107b is set on the mount 135, as shown in FIG. 12A. Since the pole core 107b is formed with the through-hole 178 being perpendicular to the axially outer end face 172, after the setting, the through-hole 178 and the axially outer end face 172 of the pole core 107b are respectively parallel to the vertical and horizontal directions with respect to the mount 135. Then, the center holder 136 is moved upward to be inserted into the through-hole 178 of the pole core 107b. With this insertion, the centers of the punch 140 and the mount 135 are definitely brought into alignment with each other. Thereafter, the claw-like holders 137 are made, by an operation of the lever 138, to press the pole core 107b, thereby holding the pole core 107b on the mount 135.

At the second step, as shown in FIG. 12B, the punch 140 is moved downward with an upper end portion of the rotary shaft 105 being vertically held by the shaft holder 139 and a lower end of the rotary shaft 105 abutting an upper end of the center holder 136. Consequently, the rotary shaft 105 is smoothly pressed into the through-hole 178 of the pole core 107b while being kept in parallel with the vertical direction.

When the rotary shaft 105 is further moved downward through the through-hole 178 of the pole core 107b to a predetermined position, the shaft holder 139 releases the rotary shaft 105, and the punch 140 is moved upward to return to an initial rest position thereof.

After that, the claw-like holders 137 are made by another operation of the lever 138 to release the pole core 107b; then, the pole core 107b is dismounted from the mount 135 with the rotary shaft 105 press-fit in the through-hole 178.

At the third step, referring to further FIG. 13A, the pole core 107a, which has the field coil 108 mounted thereto and is placed on a pallet, is griped and taken off from the pallet by a gripper 160 of the punch portion 131. Then, gripping the pole core 107a, the gripper 160 is moved downward, thereby setting the pole core 107a along with the field coil 108 on the mount 135 of the die portion 132. Thereafter, the gripper 160 releases the pole core 107a and is moved upward to an initial rest position thereof. At the same time, the center holder 136 is moved upward to be inserted into the through-hole 178 of the pole core 107a; then, the claw-like holders 137 are made by an operation of the lever 138 to press the pole core 107a, thereby holding the pole core 107a on the mount 135.

At the fourth step, referring to FIG. 13B, the gripper 160 grips the pole core 107b, which has the rotary shaft 105 press-fit therein, in such a manner that the rotary shaft 105 is parallel to the vertical direction. Then, with the lower end of the rotary shaft 105 abutting the upper end of the center holder 136, the gripper 160 is moved downward to press the rotary shaft 105 into the through-hole 178 of the pole core 107a.

When the rotary shaft 105 is further moved downward through the through-hole 178 of the pole core 107a to a predetermined position, the gripper 160 releases the rotary shaft 105 and is moved upward to return to the initial rest position thereof.

After that, the claw-like holders 137 are made by another operation of the lever 138 to release the pole core 107a; then, the pole cores 107a and 107b are dismounted from the mount 135 with the field coil 108 sandwiched therebetween and the rotary shaft 105 press-fit in the through-holes 178.

In addition, it is also possible to first assemble together the pole cores 107a and 107b with the field coil 108 sandwiched therebetween and then press the rotary shaft 105 into the through-holes 178 of the pole cores 107a and 107b.

At the fifth step, referring to FIG. 14, staking crimp is applied, using a crimp machine 150, to the pole cores 107a and 107b to securely fix them onto the rotary shaft 105.

Staking crimp is a process through which annular grooves are to be formed on the axially outer end faces 172 of the pole cores 107a and 107b around the rotary shaft 105, thereby forming plastic flows from the pole cores 107a and 107b to fill corresponding annular grooves provided on the rotary shaft 105.

The crimp machine 150 has a configuration similar to that of the pressing machine 130 described above. However, unlike the pressing machine 130, the punch portion 151 and the die portion 152 of the crimp machine 150 include a crimp punch 153 and a crimp die 154, respectively.

At this step, the pole cores 107a and 107b having the rotary shaft 105 press-fit therein and the field coil 108 mounted thereto are first set on the mount 155.

The mount 155 has the crimp die 154 concentrically disposed therein; further, the crimp die 154 has the center holder 156 concentrically and slidably disposed therein. The axis of the rotary shaft 105 is aligned with both the axes of the crimp punch 153 and the crimp die 154; thus, the axially outer end faces 172 of the pole cores 107b and 107a are respectively perpendicular to the axes of the crimp punch 153 and the crimp die 154.

With the above configuration, staking crimp is performed on the pole cores 107a and 107b when the crimp punch 153 is moved downward to press those against the crimp die 154.

As a result, through the above-described five steps, the rotor 103 is finally obtained.

The conventional rotor manufacturing method as described above may involve, however, the following problems.

When the through-holes 178 of the pole cores 107a and 107b are formed to be perpendicular to the axially outer end faces 172, the axially inner end faces 176 may not be perpendicular to the through-holes 178.

Consequently, after assembly of the rotor 103, the axially inner end faces 176 of the pole cores 107a and 107b may not be parallel to each other and thus may only partially contact with each other, resulting in an increased axial length of the rotor 103. Further, when staking crimp is applied to the pole cores 107a and 107b with the axially inner end faces 176 only in partial contact, it is difficult to secure high strength of the staking crimp. As a result, during rotation of the rotor 3, the pole cores 107a and 107b may come off the rotary shaft 105.

Otherwise, as illustrated in FIG. 15A, when the axially inner end faces 176 are brought into complete contact with each other by applying an excessive pressing force on the pole cores 107a and 107b, a bending moment will act on the rotary shaft 105. Further, when the bending moment exceeds an allowable limit for elastic deformation, the rotary shaft 105 will be inelastically deformed after the pressing step, as illustrated in FIG. 15B. Consequently, during operation, run out of the rotor 103 will be large, thus causing interference between the pole cores 107a and 107b and the stator core and increasing vibrations and rotational variation of the rotor 103.

In addition, to reduce run out of the rotor 103, finish machining may be applied to the pole cores 107a and 107b to improve the parallelism between the axially inner end faces 176 thereof. However, this will increase the steps of manufacturing and thus the cost of the rotor 103.

SUMMARY OF THE INVENTION

The present invention has been made in view of the above-mentioned problems.

It is, therefore, a primary object of the present invention to provide a method of manufacturing a rotor for a rotating electrical machine, by which it is possible to minimize the axial length of the rotor, secure high strength of the rotor, keep the rotary shaft of the rotor straight, and minimize run out of the rotor during operation, without increasing the manufacturing cost of the rotor.

According to a first aspect of the present invention, there is provided a method of manufacturing a rotor for a rotating electrical machine which includes the steps of:

a) preparing a first and a second pole core, a rotary shaft, and a field coil, each of the first and second pole cores having a base portion for mounting thereon the field coil and a plurality of claw portions for forming magnetic poles upon energizing the field coil, each of the first and second pole cores also having a through-hole formed in the base portion for press-fitting therein the rotary shaft and a contact surface for establishing intimate contact between the pole cores, the contact surface being inclined to an axis of the through-hole;

b) press-fitting the rotary shaft into the through-hole of the first pole core so that an axis of the rotary shaft coincides with the axis of the through-hole;

c) mounting the field coil on the base portion of one of the first and second pole cores;

d) opposing the first and second pole cores to each other so that the axes of the through-holes thereof are in alignment with each other and the contact surfaces thereof face each other with a maximum parallelism therebetween; and e) press-fitting the second pole core onto the rotary shaft so that the contact surfaces of the first and second pole cores maximally contact with each other and the axis of the rotary shaft coincides with the axes of the through-holes of the pole cores.

According to a second aspect of the present invention, there is provided a method of manufacturing a rotor for a rotating electrical machine which includes the steps of:

a) preparing a first and a second pole core, a rotary shaft, and a field coil, each of the first and second pole cores having a base portion for mounting thereon the field coil and a plurality of claw portions for forming magnetic poles upon energizing the field coil, each of the first and second pole cores also having a through-hole formed in the base portion for press-fitting therein the rotary shaft and a contact surface for establishing intimate contact between the pole cores, the contact surface being inclined to an axis of the through-hole;

b) mounting the field coil on the base portion of one of the first and second pole cores;

c) opposing the first and second pole cores to each other so that the axes of the through-holes thereof are in alignment with each other and the contact surfaces thereof face each other with a maximum parallelism therebetween;

d) moving one of the first and second pole cores to the other in a direction parallel to the axes of the through-holes thereof to establish maximum contact between the contact surfaces of the pole cores; and e) press-fitting the rotary shaft into the through-holes of the first and second pole cores so that an axis of the rotary shaft coincides with the axes of the through-holes of the pole cores.

According to a third aspect of the present invention, there is provided a rotor for a rotating electrical machine which is manufactured by either of the above rotor manufacturing methods according the present invention.

The rotor can have a minimum axial length, since the contact surfaces of the pole cores of the rotor are in maximum contact with each other.

Further, with the minimum axial length, it is possible to staking crimp the first and second pole cores onto the rotary shaft, thereby securely fastening them to the rotary shaft.

Furthermore, since the rotary shaft has been press-fit into the through-holes of the pole cores with the axis thereof in coincident with the axes of the through-holes, it is kept straight and there is no residual stress in the rotary shaft.

Consequently, high strength of the rotor can be secured and run out of the rotor during operation can be minimized.

In addition, since no additional finish machining has been applied to the first and second pole cores to improve the parallelism between the contact surfaces thereof, manufacturing cost of the rotor can be minimized.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIGS. 4A-4B are cross-sectional and end views illustrating an undesirable assembly of the pole cores of the rotor;

FIGS. 12A-15B are partially cross-sectional views illustrating a conventional rotor assembly process.

DESCRIPTION OF THE PREFERRED EMBODIMENTS

Figure 1:
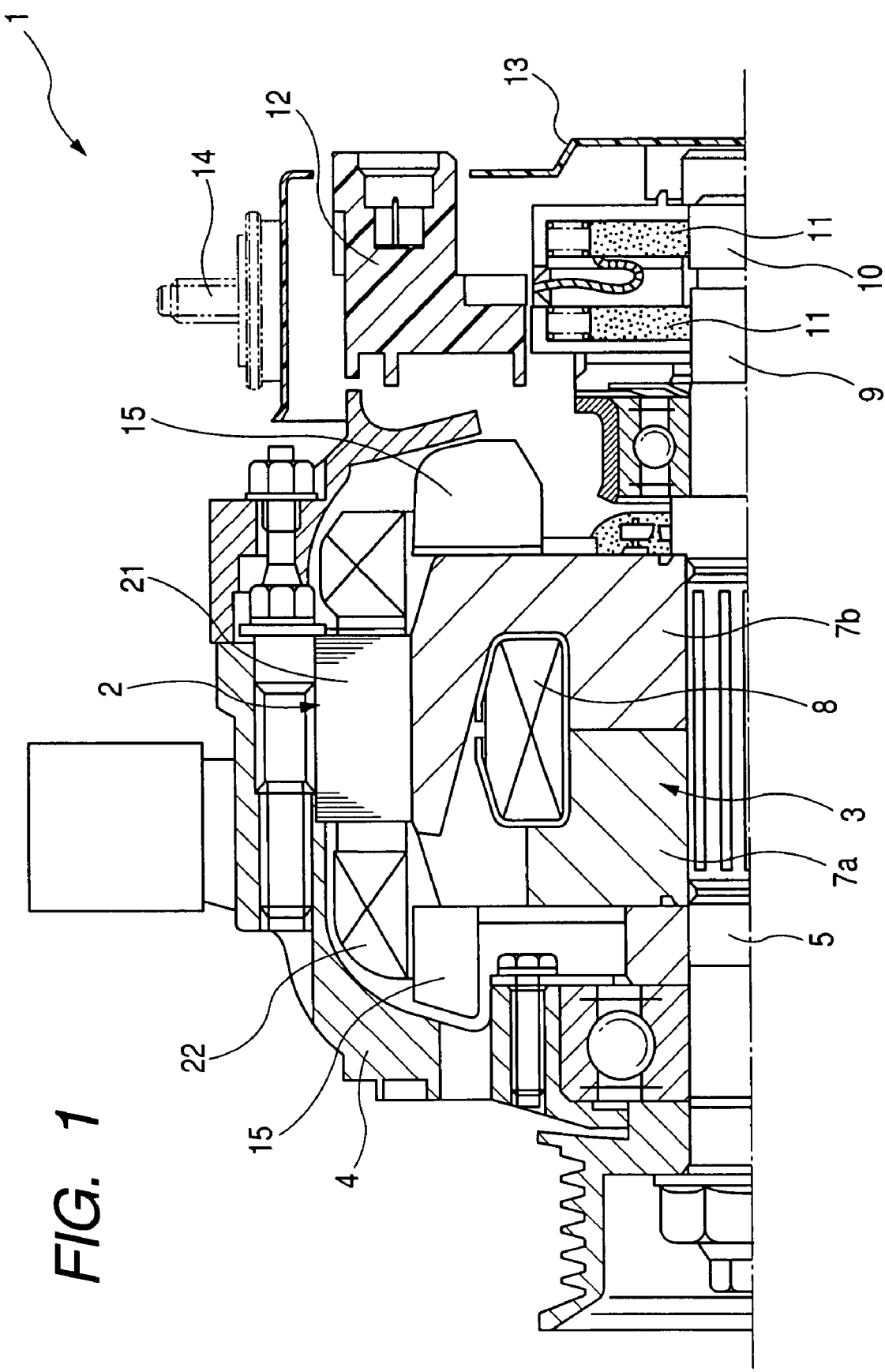
FIG. 1 is a partially cross-sectional side view showing the overall structure of an automotive alternator.

The preferred embodiments of the present invention will be described hereinafter with reference to FIGS. 1-10.

It should be noted that, for the sake of clarity and understanding, identical components having identical functions in different embodiments of the invention have been marked, where possible, with the same reference numerals in each of the figures.

First Embodiment

FIG. 1 shows the overall configuration of an automotive alternator 1 which includes a rotor 3 according to the first embodiment of the invention.

As shown in FIG. 1, the alternator 1 mainly includes a stator 2, which works as an armature, and the rotor 3 that works as a field.

The stator 2 includes a stator core 21 and a stator coil 22. The stator core 21 has a hollow cylindrical shape and is fixed to a housing 4 of the alternator 1 so as to surround the rotor 3. The stator coil 22 is wound around the stator core 21, so that AC current is induced in the stator coil 22 when the rotor 3 rotates.

The rotor 3 includes a rotary shaft 5 rotatably supported by the housing 4, a pair of lundell-type pole cores 7a and 7b fitted on the rotary shaft 5, and a field coil 8 wound around the pole cores 7a and 7b.

In addition, the alternator 1 further includes a pair of slip rings 9 and 10 provided on a rear end portion of the rotary shaft 5, a pair of brushes 11 arranged on an outer periphery of the slip rings 9 and 10, a regulator 12, a rear cover 13, an output terminal 14, and a pair of cooling fans 15.

In the present embodiment, all of the components of the alternator 1 except the rotor 3 are configured with those well-known in the art; therefore, detailed description thereof is omitted.

Figure 2:
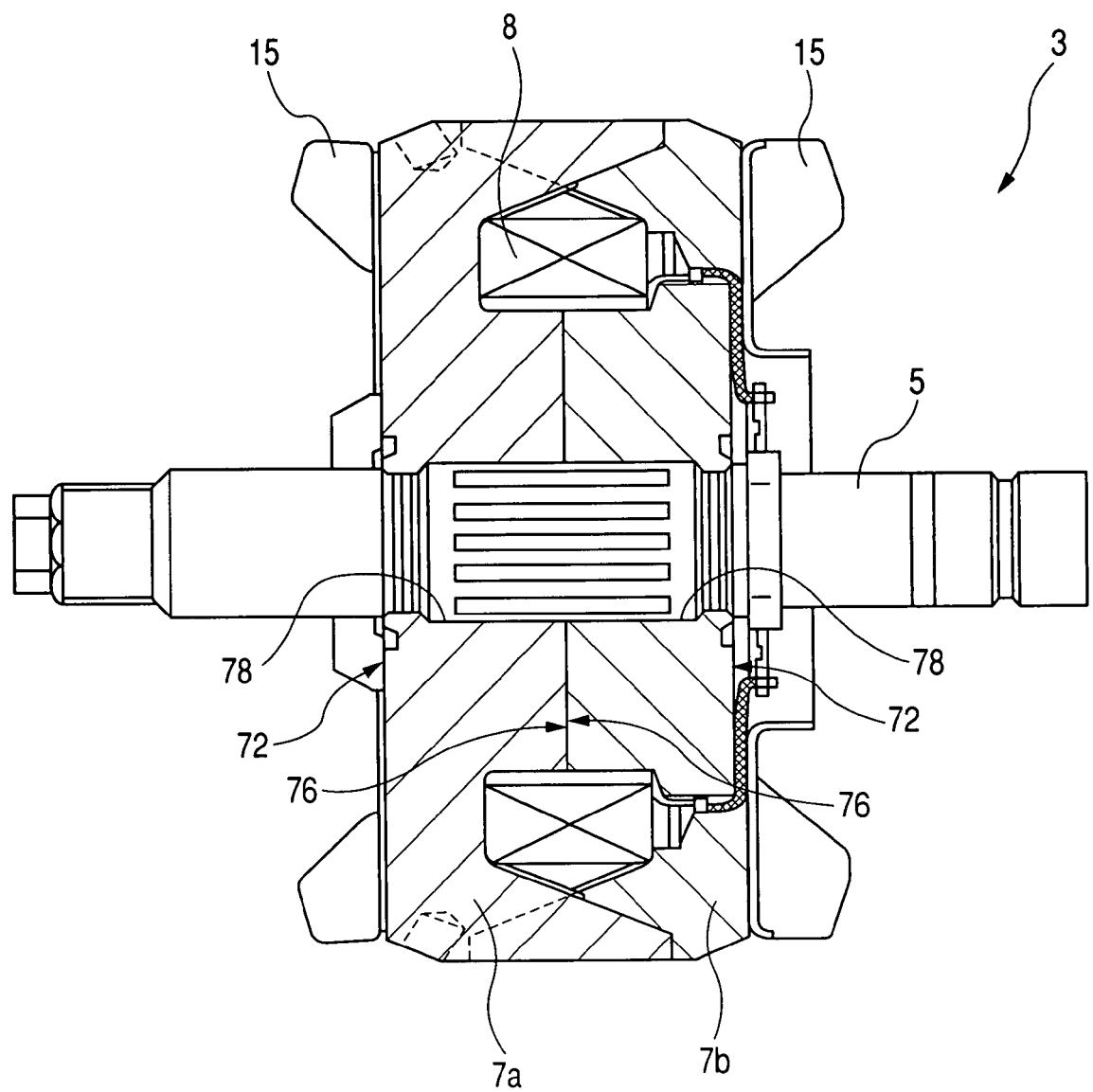
FIG. 2 is a partially cross-sectional side view showing the overall structure of a rotor, which is included in the alternator of FIG. 1, according to the first embodiment of the invention.

FIG. 2 shows the overall configuration of the rotor 3. As shown in the figure, the pole cores 7a and 7b have the same shape and are opposed to be in abutment with each other. The rotary shaft 5 has a plurality of knurls or protuberances formed on the circumferential surface thereof. The pole cores 7a and 7b are press-fit on the rotary shaft 5, so that any relative rotation between the pole cores 7a and 7b and the rotary shaft 5 is impossible. The pole cores 7a and 7b have the field coil 8 sandwiched therebetween. In addition, in the present embodiment, the pole cores 7a and 7b are made of soft steel by forging.

Figure 3:
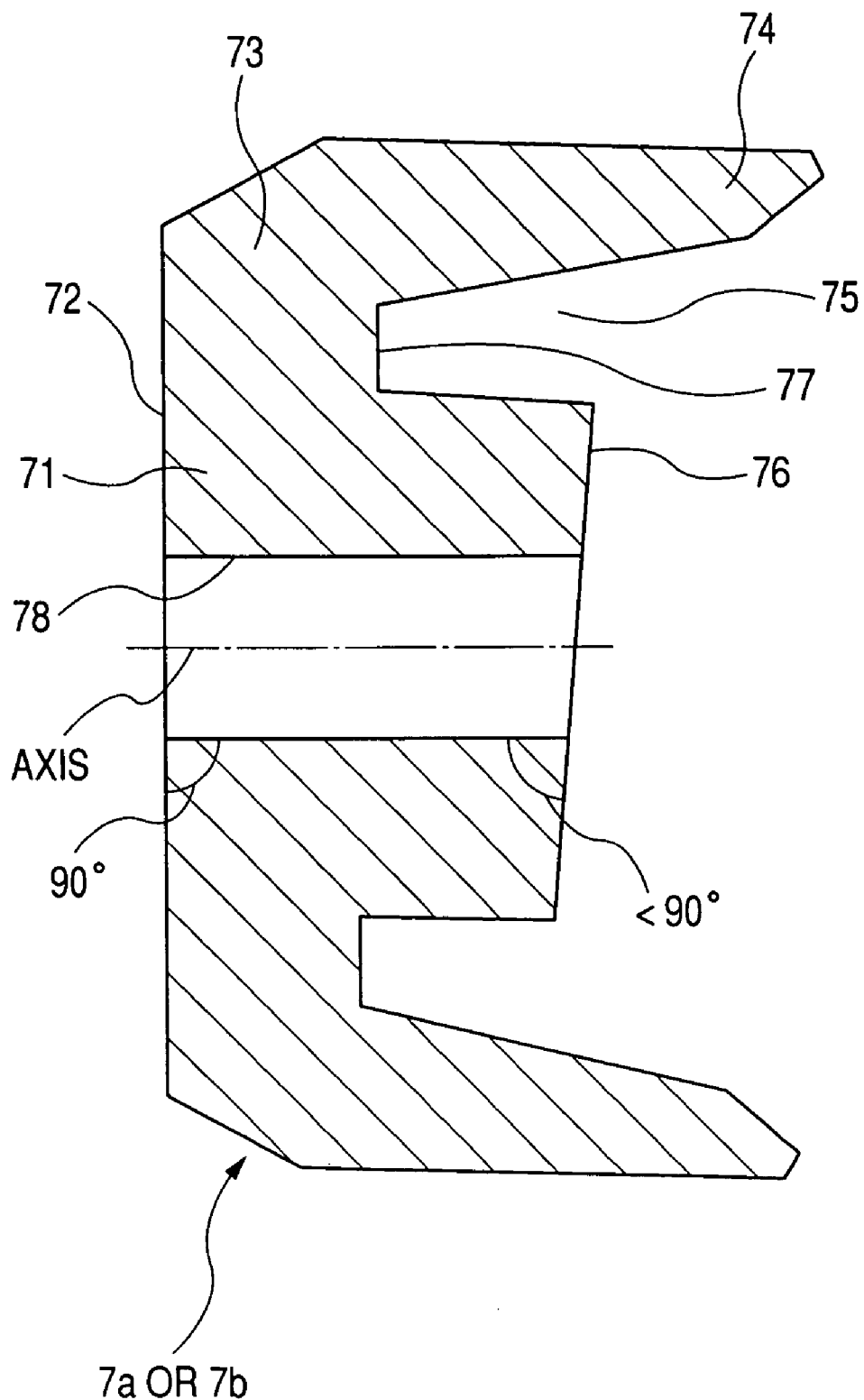
FIG. 3 is a cross-sectional side view showing the structure of pole cores of the rotor.

Referring further to FIG. 3, each the pole cores 7a and 7b includes a cylindrical base portion 71, a plurality of prismatic claw-base portions 73, and a plurality of claw portions 74.

The base portion 71 is to be press-fit on the rotary shaft 5. The claw-base portions 73 each extend radially outward from an axially outer part of the base portion 71 and are arranged in the circumferential direction at predetermined intervals. Each of the claw portions 74 axially extends from one of the claw-base portions 73. The claw portions 74 of one of the pole cores 7a and 7b are interleaved with those of the other, surrounding the field coil 8. In addition, in the present embodiment, the pole cores 7a and 7b each include eight claw portions 74 and are to be surrounded by the stator core 21.

Further, each of the pole cores 7a and 7b has an axially outer end face 72, which is composed of an axially outer end face of the base portion 71 and axially outer end faces of the claw-base portions 72, and an axially inner end face 76 that is composed only of an axially inner end face of the base portion 71. In addition, in each of the pole cores 7a and 7b, there is formed a recess 75 between the base portion 71 and the claw portions 74. The recess 75 has a bottom face 77 that is composed of axially inner end faces of the claw-base portions 73.

Each of the pole cores 7a and 7b further has a center through-hole 78 for press-fitting therein the rotary shaft 5. In the present embodiment, the through-hole 78 is formed based on the axially outer end face 72, so that the axis of the through-hole 78 is perpendicular to the axially outer end face 72.

It is desirable that in each of the pole cores 7a and 7b, both the axially inner end face 76 and the bottom face 77 are parallel to the axially outer end face 72 and thus perpendicular to the axis of the through-hole 78. However, since the pole cores 7a and 7b are forged using soft steel, the axially inner end face 76 and the bottom face 77 may not be perpendicular to the axis of the through-hole 78 depending on the forging precision.

FIGS. 4A-4B illustrate an example of the pole cores 7a and 7b, wherein the axially inner end faces 76 are not perpendicular to the axes of the corresponding through-holes 78.

As shown in FIG. 4A, after assembling the pole cores 7a and 7b with the axes of the through-holes 78 being aligned with each other, the axially inner end faces 76 are not parallel to each other, and thus only partially contact with each other at, for example, a contact point P. Consequently, there is formed a gap G between the axially inner end faces 76.

Further, as shown in FIG. 4B, when viewed along the axes of the through-holes 78, a point A1 on the end face 76 of the pole core 7a does not coincide with a point B2 on the end face 76 of the pole core 7b, and a point A2 on the end face 76 of the pole core 7a does not coincide with a point B1 on the end face 76 of the pole core 7b. Here, the point A1 is a point where the base portion 71 of the pole core 7a has a maximum axial length; the point A2 is a point where the base portion 71 of the pole core 7a has a minimum axial length. Similarly, the point B1 is a point where the base portion 71 of the pole core 7b has a maximum axial length; the point B2 is a point where the base portion 71 of the pole core 7b has a minimum axial length.

With the gap G formed between the axially inner end faces 76, the axial length of the rotor 3 will be increased and it will be difficult to secure high strength of the rotor 3 by staking crimp. To eliminate the gap G, however, it is required to apply an excessive pressing force on the pole cores 7a and 7b, which may cause an inelastic deformation of the rotary shaft 5.

In addition, if the pole cores 7a and 7b were assembled together with the axially inner end faces 76 completely contacting each other, the axes of the through-holes 78 would not be in alignment with each other. Thus, it would be impossible to press the rotary shaft 5 into the through-holes 78 without causing any inelastic deformation of the rotary shaft 5.

The inventor of the present invention have considered that the axially inner end faces 76 of the pole cores 7a and 7b can be made parallel to each other and thus the gap G therebetween can be eliminated by making the point A1 on the end face 76 of the pole core 7a and the point B2 on the end face 76 of the pole core 7b coincide with each other through relative rotation between the pole cores 7a and 7b. Alternatively, the gap G can also be eliminated by making the point A2 on the end face 76 of the pole core 7a and the point B1 on the end face 76 of the pole core 7b coincide with each other through relative rotation between the pole cores 7a and 7b.

Figure 5A:
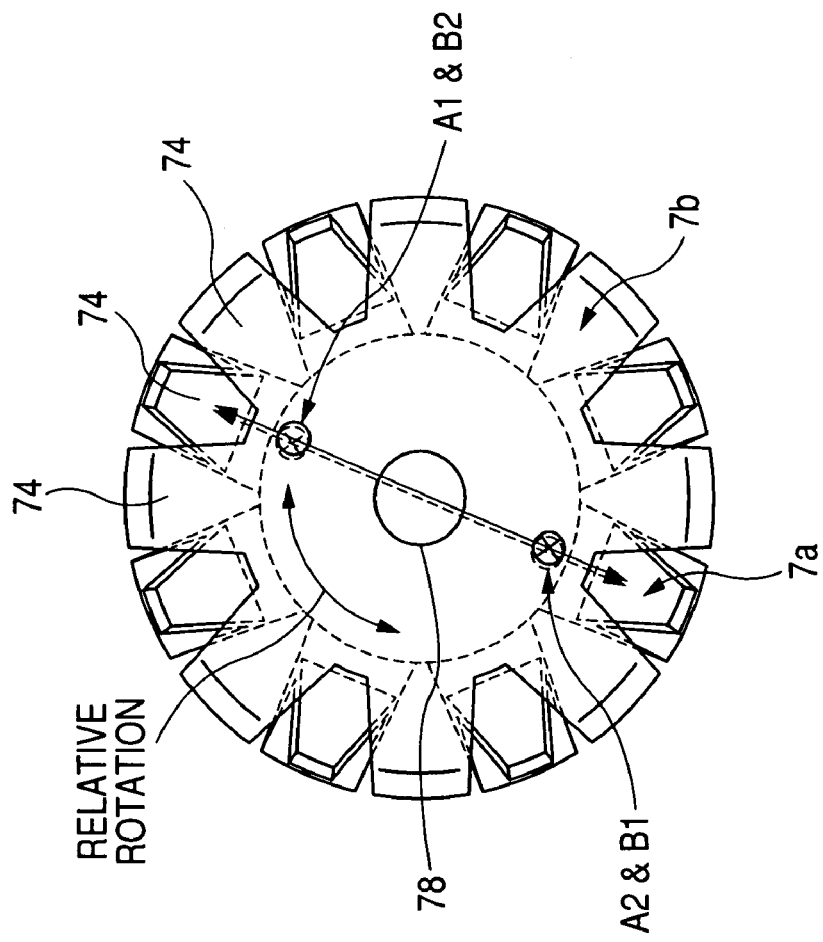
FIGS. 5A-5B are cross-sectional and end views illustrating a desirable assembly of the pole cores according to the first embodiment of the invention.
Figure 5B:
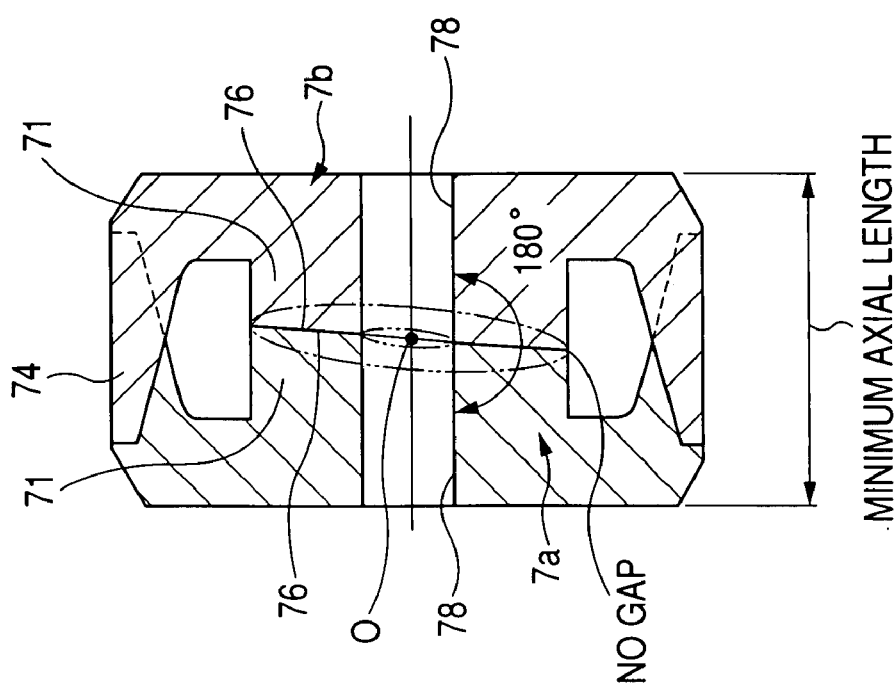

FIGS. 5A-5B illustrate an example of the pole cores 7a and 7b that are assembled together based on the above consideration.

As shown in FIG. 5B, when viewed along the axes of the through-holes 78, the points A1 and A2 on the axially inner end face 76 of the pole core 7a coincide respectively with the points B2 and B1 on the axially inner end face 76 of the pole core 7b. In other words, the points A1 and A2 coincide respectively with the points B2 and B1 in the axial direction of the through-holes 78.

Consequently, as shown in FIG. 5A, though the axially inner end faces 76 of the pole cores 7a and 7b are not perpendicular to the axes of the through-holes 78, they are parallel to and in complete contact with each other without any gap therebetween, thus minimizing the axial length of the pole cores 7a and 7b. Further, the pole cores 7a and 7b are in point symmetry with respect to a point O which represents the intersection between the axially inner end faces 76 and the axes of the through-holes 78 of the pole cores 7a and 7b. In other words, it is possible to establish complete contact between the axially inner end faces 76 through bringing them into point symmetry with respect to the point O.

Moreover, to bring the axially inner end faces 76 into point symmetry, it is required to first locate the points A1 and A2 on the end face 76 of the pole core 7a and the points B1 and B2 on the end face 76 of the pole core 7b. The locating process may be performed either automatically or manually.

For example, in the case of automatically performing the locating process, a locating apparatus (not shown) may be used, which includes a rotating means, a rotational position detecting means, an axial length measuring means, an elevator means, and a controller. The elevator means carries thereon all the other three means and works to move them upward and downward. A work, which is either of the pole cores 7a and 7b, may be rotatably mounted on a mount (not shown) under the locating apparatus. During operation, the elevator means moves all of the three means downward to make contact with the work. Then, the rotating means rotates the work in a plurality of stages, in each of which the rotational position detecting means detects a rotational position of the work and the axial length measuring means measures the axial length of the work at that rotational position. After one complete turn of the work, the elevator means moves the three means upward to return to initial positions thereof. Then, based on the detected rotational positions and the correspondingly measured axial lengths of the work, both the maximum-axial-length point (i.e., A1 or B1) and the minimum-axial-length point (i.e., A2 or B2) of the work is determined by a controller.

Figure 6:
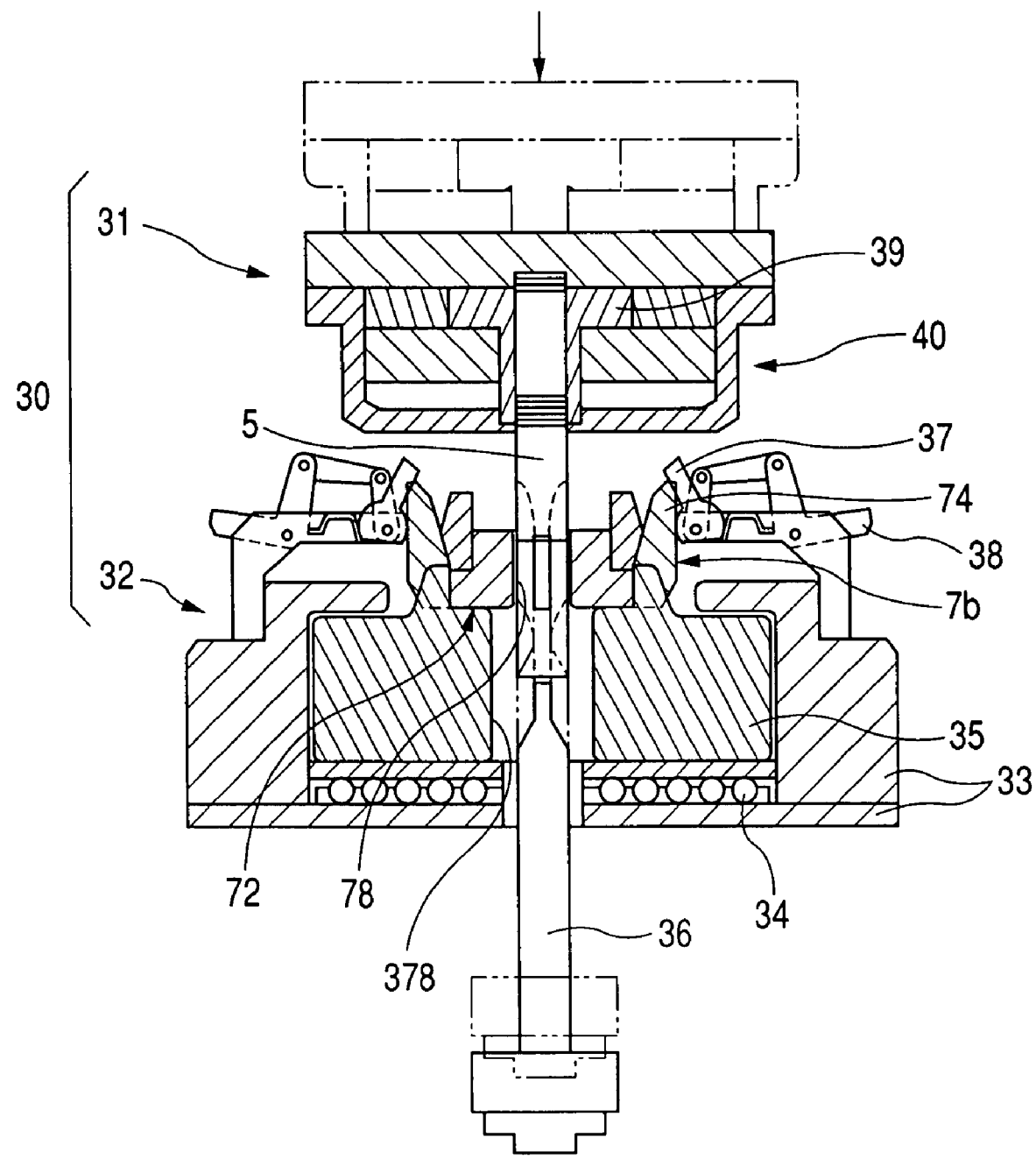
FIGS. 6-8 are partially cross-sectional views illustrating a rotor assembly process according to the first embodiment of the invention.
Figure 7:
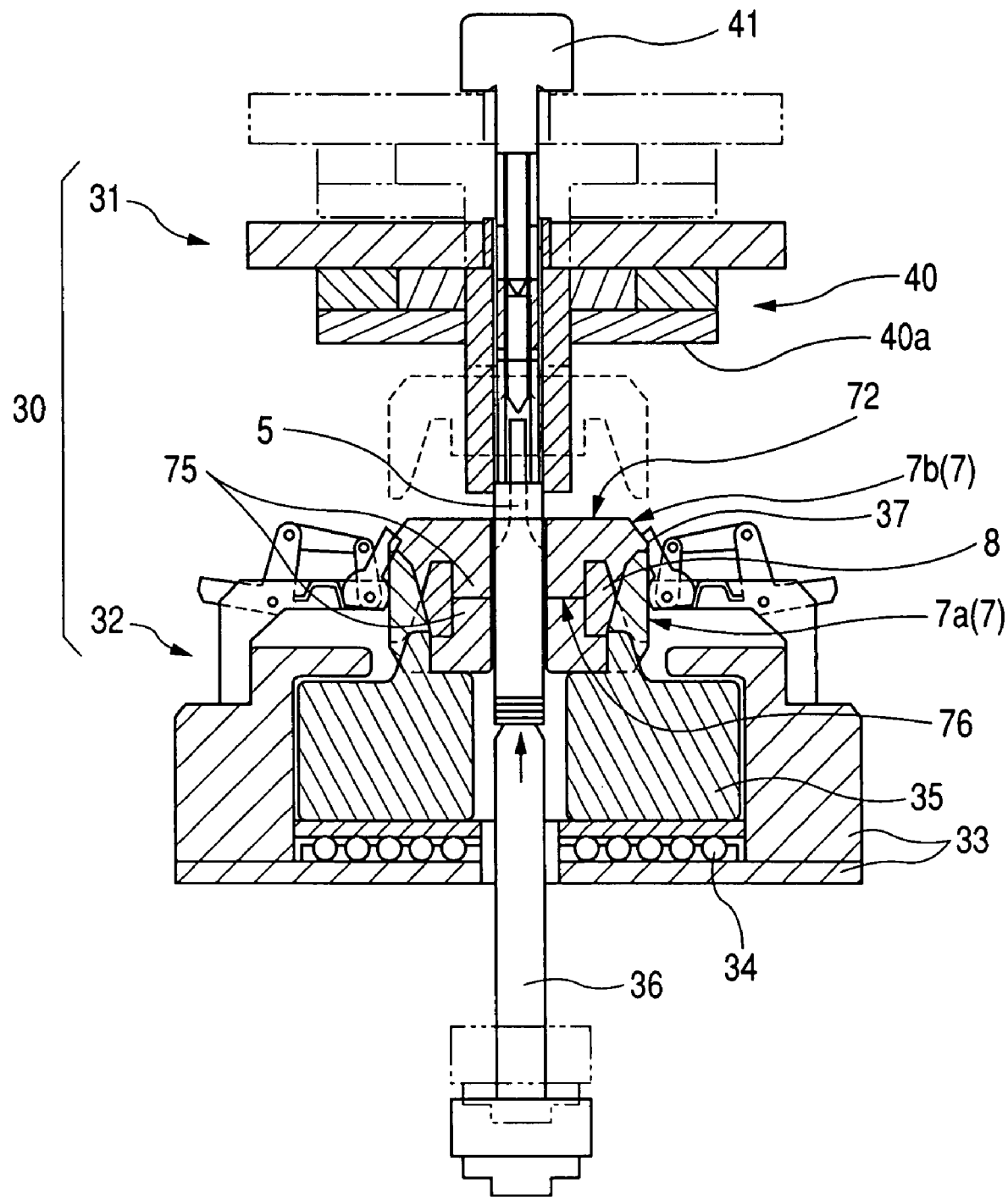
Figure 8:
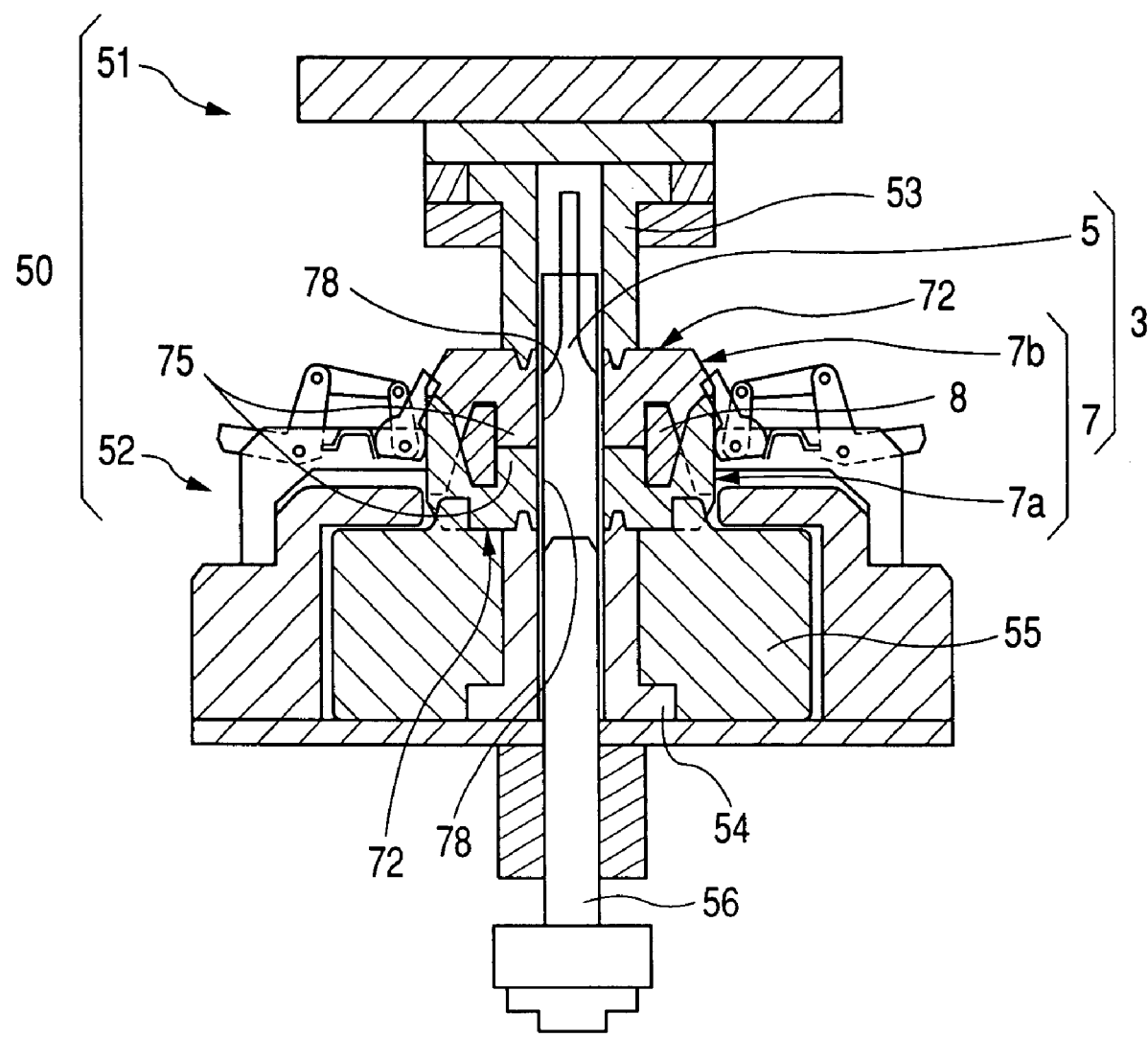

FIGS. 6-8 illustrate an assembly process of the rotor 3 according to the present embodiment.

As shown in FIG. 6, in the present embodiment, a pressing machine 30 is used for pressing the rotary shaft 5 into the through-holes 78 of the pole cores 7a and 7b, which includes a punch portion 31 and a die portion 32.

The punch portion 31 includes a punch 40 that is configured to move upward and downward. Further, the punch 40 includes therein a shaft holder 39 for holding the shaft 5 to be parallel to the vertical direction.

The die portion 32 includes a base 33, a bearing 34 provided on the base 33, and a mount 35 that is supported by the base 33 through the bearing 34. The mount 35 has a center through-hole 378 within which a center holder 36 is slidably disposed. The bearing 34 also serves to move the mount 35 horizontally, when the center of the mount 35 does not coincide with that of the center holder 36, thereby bringing the centers of the mount 35 and the center holder 36 into coincident with each other. Further, in the die portion 32, there are provided at least two claw-like holders 37 fixed to the base 33. The claw-like holders 37 work to press both axially and radially the pole core 7b, which is set on the mount 35 as a work, so as to hold it on the mount 35. In addition, it is possible to selectively make, using a lever 38, the claw-like holders 37 either hold or release the work set on the mount 35 (i.e., the pole core 7b in this case).

The rotor assembly process according to the present embodiment includes the following steps.

At the first step, the pole core 7b is set on the mount 35 of the die portion 32 of the pressing machine 30, as shown in FIG. 6. It should be noted that the points B1 and B2 on the axially inner end face 76 of the pole core 7b have been located prior to this step.

Since the pole core 7b is formed with the through-hole 78 being perpendicular to the axially outer end face 72, after the setting, the through-hole 78 and the axially outer end face 72 of the pole core 7b are respectively parallel to the vertical and horizontal directions with respect to the mount 35. Then, the center holder 36 is moved upward to be inserted into the through-hole 78 of the pole core 7b. With this insertion, the centers of the punch 40 and the mount 35 are definitely brought into alignment with each other. Thereafter, the claw-like holders 37 are made, by an operation of the lever 38, to press the pole core 7b, thereby holding the pole core 7b on the mount 35.

At the second step, as shown in FIG. 6, the punch 40 is moved downward with an upper end portion of the rotary shaft 5 being vertically held by the shaft holder 39 and a lower end of the rotary shaft 5 abutting an upper end of the center holder 36. Consequently, the rotary shaft 5 is smoothly pressed into the through-hole 78 of the pole core 7b while being kept in parallel with the vertical direction.

When the rotary shaft 5 is further moved downward through the through-hole 78 of the pole core 7b to a predetermined position, the shaft holder 39 releases the rotary shaft 5, and the punch 40 is moved upward to return to an initial rest position thereof which is indicated with two-dot chain lines in FIG. 6.

After that, the claw-like holders 37 are made by another operation of the lever 38 to release the pole core 7b; then, the pole core 7b is dismounted from the mount 35 with the rotary shaft 5 press-fit in the through-hole 78.

At the third step, the pole core 7a, which has the field coil 8 mounted thereto, is set on the mount 35 of the die portion 32 in the same way as setting the pole core 7b at the first step. It should be noted that the points A1 and A2 on the axially inner end face 76 of the pole core 7a have been located prior to this step.

At the fourth step, a gripper (not shown) of the punch portion 31 grips the pole core 7b, which has the rotary shaft 5 press-fit therein, and locates the pole core 7b above the pole core 7a mounted on the mount 35 so that the axes of the through-holes 78 of the pole cores 7a and 7b are in alignment with each other.

At the fifth step, the pole core 7b is rotated by the gripper to an optimal position where when viewed along the axis of the rotary shaft 5, the points B1 and B2 of the pole core 7b coincide respectively with the points A1 and A2 of the pole core 7a. In other words, at the optimal position, the axially inner end faces 76 of the pole cores 7a and 7b are parallel to each other.

At the sixth step, referring to FIG. 7, the punch 40 is moved downward with a punch surface 40a thereof pressing the axially outer end face 72 of the pole core 7b and a lower end of a center holder 41 of the punch portion 31 abutting the upper end of the rotary shaft 5. The center holder 41 is provided to keep the axes of the punch 40 and the rotary shaft 5 in alignment with each other. Consequently, the rotary shaft 5 is smoothly pressed into the through-hole 78 of the pole core 7a mounted on the mount 35 until the axially inner end faces 76 of the pole cores 7a and 7b make complete contact with each other.

Since the pole core 7b has been rotated to the optimal position at the fifth step, it becomes possible to establish the complete contact between the axially inner end faces 76 of the pole cores 7a and 7b without causing any inelastic deformation of the rotary shaft 5, thereby minimizing the axial length of the pole cores 7a and 7b and keeping the rotary shaft 5 straight.

After that, the punch 40 is moved upward to return to the initial rest position thereof, and the claw-like holders 37 are made, by an operation of the lever 38, to release the pole core 7a.

At the seventh step, referring further to FIG. 8, staking crimp is applied, using a crimp machine 50, to the pole cores 7a and 7b to securely fix them onto the rotary shaft 5.

The crimp machine 50 has a configuration similar to that of the pressing machine 30 described above. However, unlike the pressing machine 30, the punch portion 51 and the die portion 52 of the crimp machine 50 include a crimp punch 53 and a crimp die 54, respectively.

At this step, the pole cores 7a and 7b having the rotary shaft 5 press-fit therein and the field coil 8 mounted thereto are first set on the mount 55.

As shown in FIG. 8, the mount 55 has the crimp die 54 concentrically disposed therein; further, the crimp die 54 has the center holder 56 concentrically and slidably disposed therein. The axis of the rotary shaft 5 is aligned with both the axes of the crimp punch 53 and the crimp die 54; thus, the axially outer end faces 72 of the pole cores 7b and 7a are respectively perpendicular to the axes of the crimp punch 53 and the crimp die 54.

With the above configuration, staking crimp is performed on the pole cores 7a and 7b when the crimp punch 53 is moved downward to press those against the crimp die 54.

As a result, through the above-described seven steps, the rotor 3 is finally obtained. In the rotor 3, the axially inner end faces 76 of the pole cores 7a and 7b are in complete contact with each other without any gap therebetween, thus allowing the rotor 3 to have a minimum axial length.

Further, since the rotary shaft 5 has been pressed into the pole cores 7a and 7b without any inelastic deformation, it is kept straight and there is no residual stress in the rotary shaft 5.

Furthermore, since the staking crimp has been applied with the axially inner end faces 76 of the pole cores 7a and 7b in complete contact with each other, high strength of the rotor 3 is secured.

Consequently, during operation of the alternator 1, the pole cores 7a and 7b are prevented from coming off the rotary shaft 5, and run out of the rotor 3 can be minimized. Accordingly, the rotor 3 is prevented from interfering with the stator core 21, and vibrations and rotational variation of the rotor 3 can be minimized. In addition, it is also possible to secure a long service life of bearings supporting the rotor 3 and effectively suppress variation in power output of the alternator 1.

Second Embodiment

This embodiment illustrates a rotor assembly process which is different from that described in the previous embodiment.

In the previous embodiment, the rotary shaft 5 is pressed into the pole cores 7a and 7b at different steps. However, it is also possible to first assemble together the pole cores 7a and 7b and then press the rotary shaft 5 into both the pole cores 7a and 7b at the same step.

Figure 9:
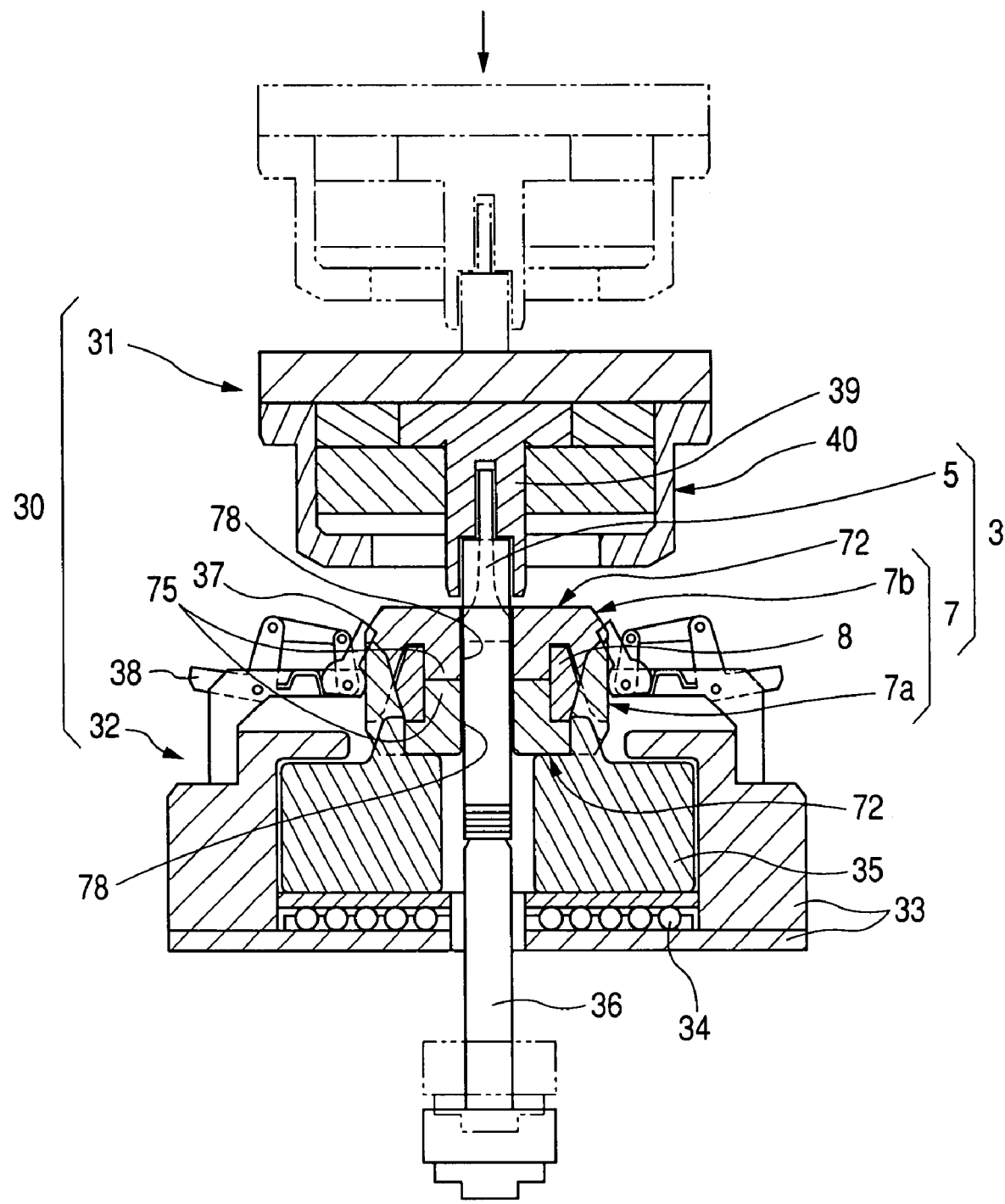
FIG. 9 is a partially cross-sectional view illustrating a rotor assembly process according to the second embodiment of the invention.

FIG. 9 illustrates the rotor assembly process according to the present embodiment, which can be carried out using the pressing machine 30 described in the previous embodiment.

As shown in FIG. 9, in the present embodiment, the pole cores 7a and 7b are first set on the mount 35 of the die portion 32 of the pressing machine 30.

The pole cores 7a and 7b have been assembled so that the axes of the through-holes 78 are in alignment with each other, the axially outer end faces 72 are parallel to each other, and the axially inner end faces 76 are in complete contact with each other. Further, the pole cores 7a and 7b have the field coil 8 sandwiched therebetween. In addition, the complete contact between the axially inner end faces 76 has been established by: opposing the pole cores 7a and 7b with the axes of the through holes 78 in alignment with each other and the axially inner end faces 76 facing each other; rotating one of the pole cores 7a and 7b about the axis of the through-hole 78 to an optimal position where the axially inner end faces 76 of the pole cores 7a and 7b are parallel to each other; and moving one of the pole cores 7a and 7b to the other in a direction parallel to the axes of the through-holes 78 to establish maximum contact between the axially inner end faces 76.

The mount 35 has disposed therein the center holder 36 which further extends into the through-hole 78 of the pole core 7a. Accordingly, the axially outer end faces 72 of the pole cores 7a and 7b are kept parallel to the horizontal direction. The claw-like holders 37 are made, by an operation of the lever 38, to press both the pole cores 7a and 7b, thereby holding them on the mount 35.

Then, the punch 40 is moved downward with the upper end portion of the rotary shaft 5 being vertically held by the shaft holder 39 and the lower end of the rotary shaft 5 abutting the upper end of the center holder 36. Consequently, the rotary shaft 5 is smoothly pressed into the through-holes 78 of the pole cores 7a and 7b while being kept in parallel with the vertical direction.

When the rotary shaft 5 is further moved downward through the through-holes 78 of the pole cores 7a and 7b to a predetermined position, the shaft holder 39 releases the rotary shaft 5, and the punch 40 is moved upward to return to an initial rest position thereof which is indicated with dashed lines in FIG. 9. Then, the claw-like holders 37 are made, by another operation of the lever 38, to release the pole cores 7a and 7b.

After that, staking crimp is applied to the pole cores 7a and 7b in the same way as in the previous embodiment, thereby securely fixing them onto the rotary shaft 5.

As a result, a rotor 3 is finally obtained which has the same advantages as that of the previous embodiment.

In addition, the rotor assembly process of the present embodiment has less steps than that of the previous embodiment, thus improving the productivity and reducing the manufacturing cost of the rotor 3.

Third Embodiment

This embodiment illustrates a formation of the pole cores 7a and 7b which is different from that described in the first embodiment.

Referring again to FIG. 5B, in the first embodiment, the pole core 7a is so formed that a line A1-A2 connecting the maximum-axial-length point A1 and the minimum-axial-length point A2 passes, when viewed along the axis of the through-hole 78, the circumferential centers of two of the claw portions. On the other hand, the pole core 7b is so formed that a line B1-B2 connecting the maximum-axial-length point B1 and the minimum-axial-length point B2 passes, when viewed along the axes of the through-hole 78, the circumferential centers of two of gaps formed between the claw portions 74.

With the above formation, the pole cores 7a and 7b are not identical to each other, and thus are required to be forged using different forging dies.

Figure 10:
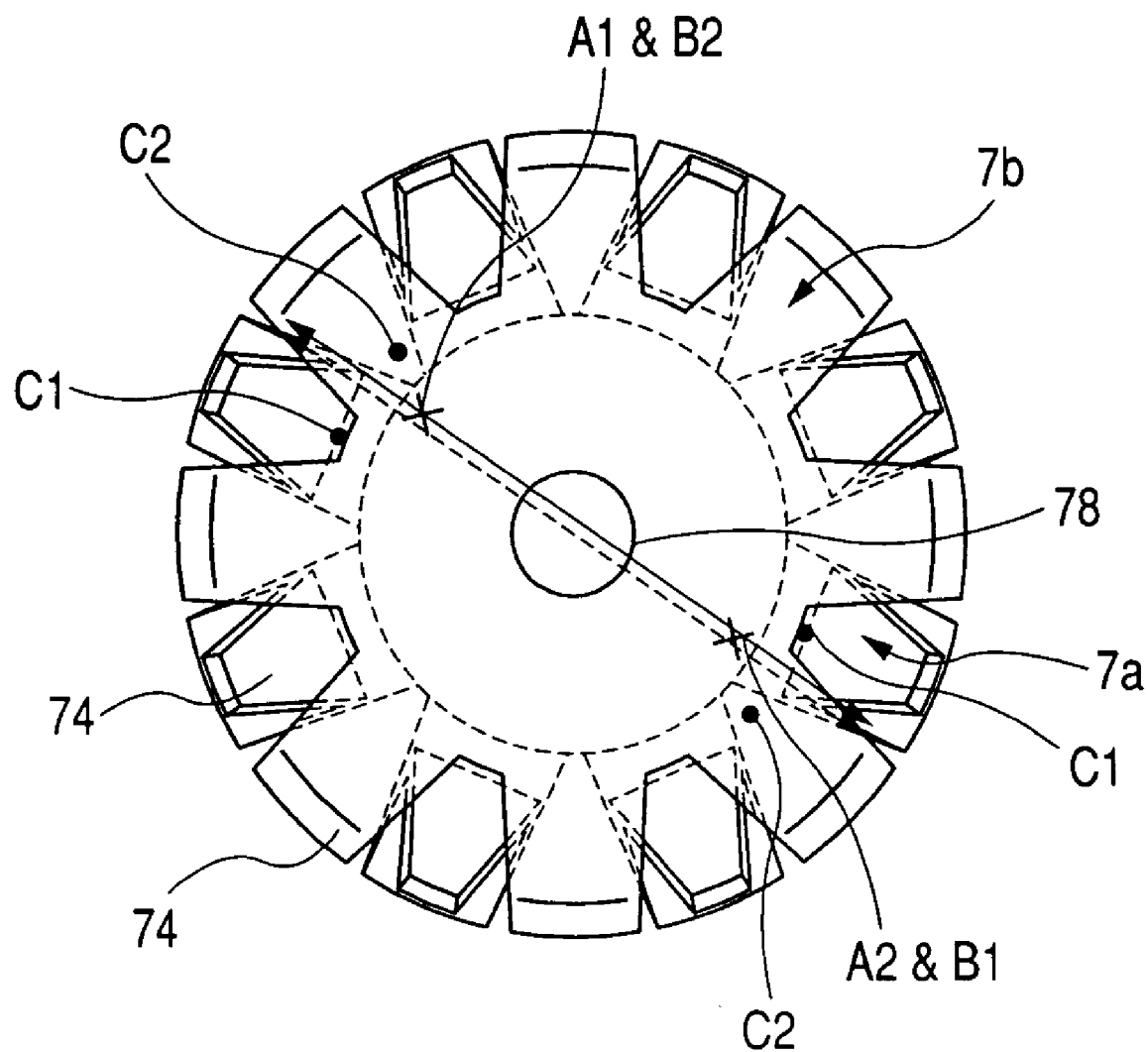
FIG. 10 is an end view illustrating a formation of pole cores according to the third embodiment of the invention.
Figure 11:
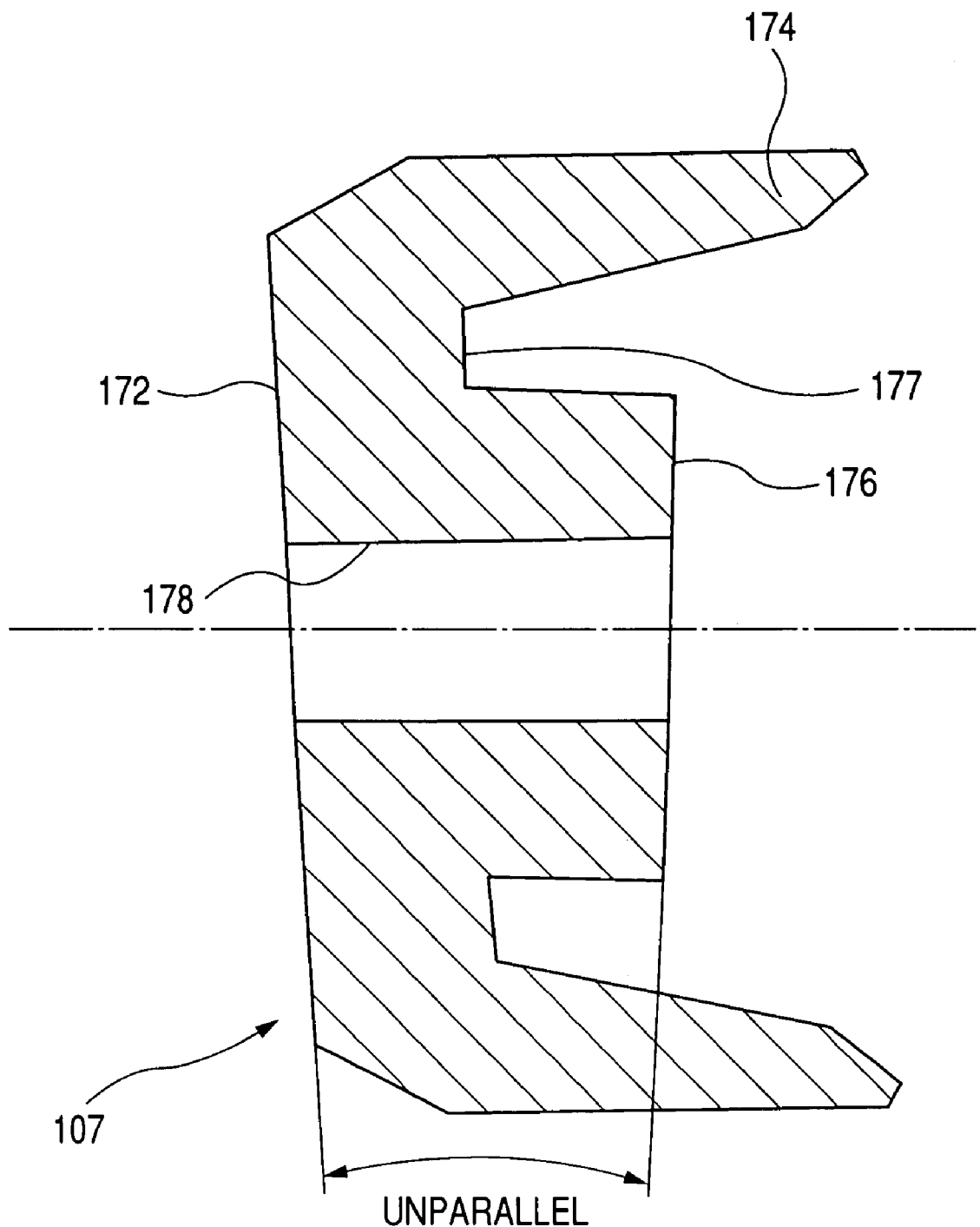
FIG. 11 is a cross-sectional side view showing the structure of pole cores of a conventional rotor.
Figure 14:
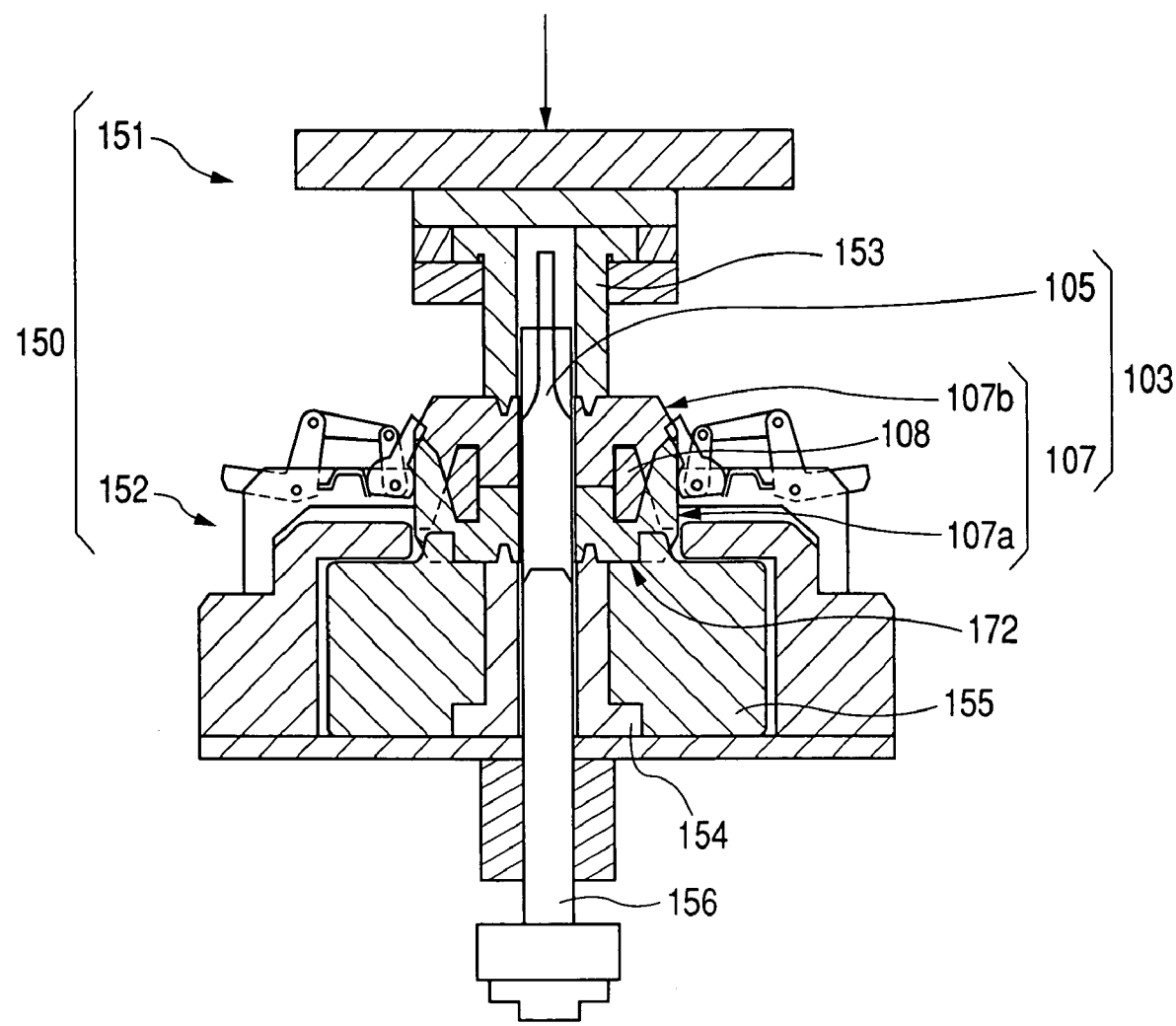
Figure 15A:
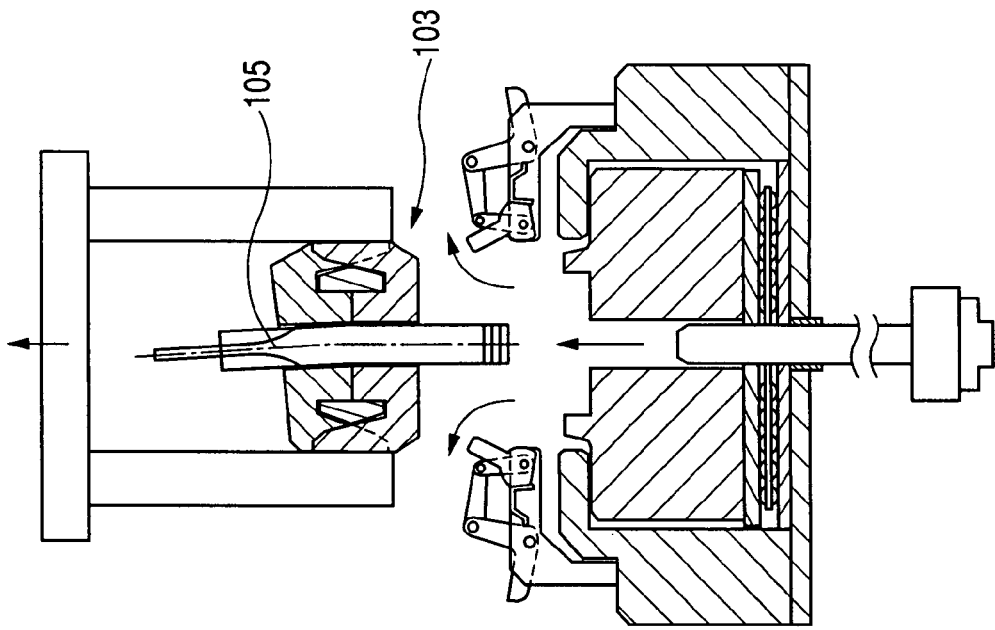
Figure 15B:
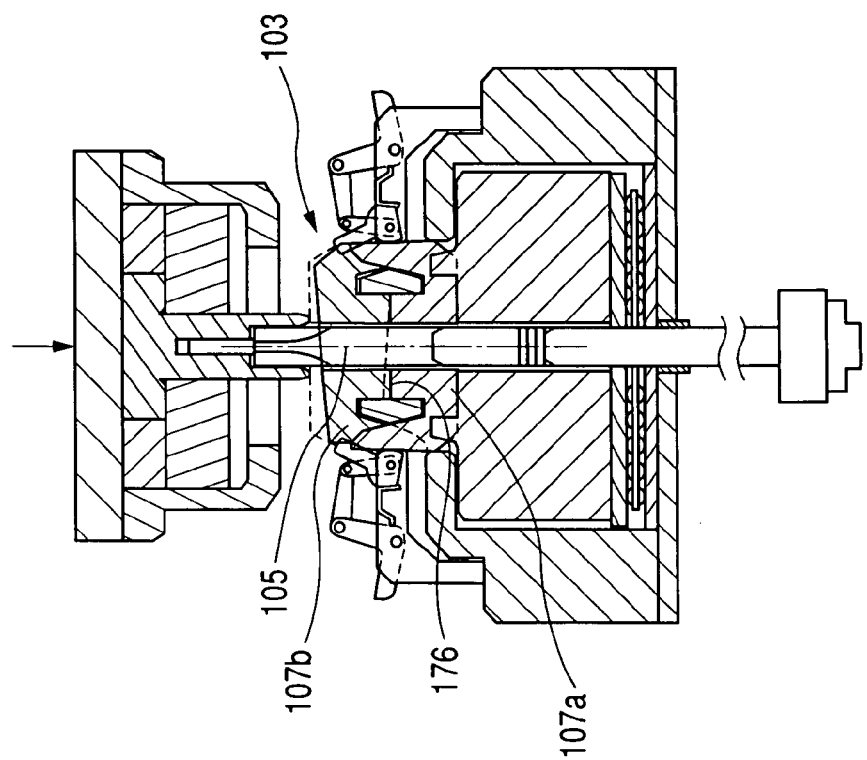

In comparison, referring to FIG. 10, in the present embodiment, the pole core 7a is so formed that the line A1-A2 lies, when viewed along the axis of the through-hole 78, at the same distance from the circumferential centers C1 of two of the claw portions 74 and the circumferential centers C2 of two of the gaps formed between the claw portions 74. Similarly, the pole core 7b is so formed that the line B1-B2 lies, when viewed along the axis of the through-hole 78, at the same distance from the circumferential centers C2 of two of the claw portions 74 and the circumferential centers C1 of two of the gaps formed between the claw portions 74.

With this formation, the pole cores 7a and 7b can be identical to each other, and thus can be forged using the same forging die. Consequently, compared to the formation of the first embodiment, the manufacturing cost of the rotor 3 can be reduced.

While the above particular embodiments of the invention have been shown and described, it will be understood by those who practice the invention and those skilled in the art that various modifications, changes, and improvements may be made to the invention without departing from the spirit of the disclosed concept.

For example, though the rotor 3 has only the single pair of pole cores 7a and 7b press-fit on the rotary shaft 5 in the previous embodiments, it may also have more than one pair of pole cores press-fit on a single rotary shaft so as to form a tandem rotor.

Moreover, though the rotor 3 is described as for use in the automotive alternator 1 in the previous embodiments, it may also be applicable to other rotating electrical machines, such as an AC motor.

Such modifications, changes, and improvements within the skill of the art are intended to be covered by the appended claims.

What is claimed is:

1. A method of manufacturing a rotor for a rotating electrical machine, comprising the steps of:
   a) preparing a first and a second pole core, a rotary shaft, and a field coil, each of the first and second pole cores having a base portion for mounting thereon the field coil and a plurality of claw portions for forming magnetic poles upon energizing the field coil, each of the first and second pole cores also having a through-hole formed in the base portion for press-fitting therein the rotary shaft and a contact surface for establishing intimate contact between the pole cores, the contact surface being oblique to an axis of the through-hole;
   b) press-fitting the rotary shaft into the through-hole of the first pole core so that an axis of the rotary shaft coincides with the axis of the through-hole;
   c) mounting the field coil on the base portion of one of the first and second pole cores;
   d) opposing the first and second pole cores to each other so that the axes of the through-holes thereof are in alignment with each other and the contact surfaces thereof face each other with a maximum parallelism therebetween; and e) press-fitting the second pole core onto the rotary shaft so that the contact surfaces of the first and second pole cores maximally contact with each other and the axis of the rotary shaft coincides with the axes of the through-holes of the pole cores.

2. The method as set forth in claim 1, wherein each of the contact surfaces of the first and second pole cores is a flat surface.

3. The method as set forth in claim 1, further comprising staking crimping the first and second pole cores onto the rotary shaft after the step e.

4. The method as set forth in claim 1, wherein the step d comprises:
   opposing the first and second pole cores to each other with the axes of the through-holes thereof in alignment with each other; and
   rotating one of the first and second pole cores about the axis of the through-hole thereof to an optimal position where the contact surfaces thereof are maximally parallel to each other.

5. The method as set forth in claim 4, wherein each of the contact surfaces of the first and second pole cores has a maximum-length point, at which the base portion of the pole core has a maximum length in an axial direction of the through-hole thereof, and a minimum-length point at which the base portion of the pole core has a minimum length in the axial direction, and
   wherein at the optimal position, the maximum-length point on the contact surface of one of the pole cores coincides with the minimum-length point on the contact surface of the other pole core when viewed along the axes of the through-holes of the pole cores.

6. The method as set forth in claim 5, wherein each of the first and second pole cores is so formed that a hypothetical line connecting the maximum-length and minimum-length points lies, when viewed along the axis of the through-hole, at the same distance from the circumferential centers of two of the claw potions and the circumferential centers of two of gaps formed between the claw portions.

7. The method as set forth in claim 1, wherein each of the first and second pole cores further has an end face that is opposite to the contact surface of the pole core in an axial direction of the through-hole of the pole core, and
   wherein each of the first and second pole cores is so formed that the axis of the through-hole is perpendicular to the end face of the pole core.

8. The method as set forth in claim 1, wherein both the first and second pole cores are of lundell-type.

9. The method as set forth in claim 8, wherein the step d comprises:
   opposing the first and second pole cores to each other with the axes of the through-holes thereof in alignment with each other; and
   rotating one of the first and second pole cores about the axis of the through-hole thereof, keeping the claw portions of the first pole core apart from the claw portions of the second pole core in an axial direction of the through-hole, to an optimal position where the contact surfaces of the first and second pole cores are maximally parallel to each other.

10. The method as set forth in claim 1, wherein the rotor is designed for use in an automotive alternator.

11. A method of manufacturing a rotor for a rotating electrical machine, comprising the steps of:

a) preparing a first and a second pole core, a rotary shaft, and a field coil, each of the first and second pole cores having a base portion for mounting thereon the field coil and a plurality of claw portions for forming magnetic poles upon energizing the field coil, each of the first and second pole cores also having a through-hole formed in the base portion for press-fitting therein the rotary shaft and a contact surface for establishing intimate contact between the pole cores, the contact surface being oblique to an axis of the through-hole;

b) mounting the field coil on the base portion of one of the first and second pole cores;

c) opposing the first and second pole cores to each other so that the axes of the through-holes thereof are in alignment with each other and the contact surfaces thereof face each other with a maximum parallelism therebetween;

d) moving one of the first and second pole cores to the other in a direction parallel to the axes of the through-holes thereof to establish maximum contact between the contact surfaces of the pole cores; and e) press-fitting the rotary shaft into the through-holes of the first and second pole cores so that an axis of the rotary shaft coincides with the axes of the through-holes of the pole cores.

12. The method as set forth in claim 11, wherein each of the contact surfaces of the first and second pole cores is a flat surface.

13. The method as set forth in claim 11, further comprising staking crimping the first and second pole cores onto the rotary shaft after the step e.

14. The method as set forth in claim 11, wherein the step c comprises:
   opposing the first and second pole cores to each other with the axes of the through-holes thereof in alignment with each other; and
   rotating one of the first and second pole cores about the axis of the through-hole thereof to an optimal position where the contact surfaces thereof are maximally parallel to each other.

15. The method as set forth in claim 14, wherein each of the contact surfaces of the first and second pole cores has a maximum-length point at which the base portion of the pole core has a maximum length in an axial direction of the through-hole thereof, and a minimum-length point at which the base portion of the pole core has a minimum length in the axial direction, and
   wherein at the optimal position, the maximum-length point on the contact surface of one of the pole cores coincides with the minimum-length point on the contact surface of the other pole core when viewed along the axes of the through-holes of the pole cores.

16. The method as set forth in claim 15, wherein each of the first and second pole cores is so formed that a hypothetical line connecting the maximum-length and minimum-length points lies, when viewed along the axis of the through-hole, at the same distance from the circumferential centers of two of the claw potions and the circumferential centers of two of gaps formed between the claw portions.

17. The method as set forth in claim 11, wherein each of the first and second pole cores further has an end face that is opposite to the contact surface of the pole core in an axial direction of the through-hole of the pole core, and
   wherein each of the first and second pole cores is so formed that the axis of the through-hole is perpendicular to the end face of the pole core.

18. The method as set forth in claim 11, wherein both the first and second pole cores are of lundell-type.

19. The method as set forth in claim 18, wherein the step c comprises:
opposing the first and second pole cores to each other with the axes of the through-holes thereof in alignment with each other; and
rotating one of the first and second pole cores about the axis of the through-hole thereof, keeping the claw portions of the first pole core apart from the claw portions of the second pole core in an axial direction of the through-hole, to an optimal position where the contact surfaces of the first and second pole cores are maximally parallel to each other.

20. The method as set forth in claim 11, wherein the rotor is designed for use in an automotive alternator.

* * * * *